(12) United States Patent
Chen et al.

(10) Patent No.: US 12,270,918 B2
(45) Date of Patent: Apr. 8, 2025

(54) GLOBAL POSITIONING SYSTEM BIAS DETECTION AND REDUCTION

(71) Applicant: GM Global Technology Operations LLC, Detroit, MI (US)

(72) Inventors: Gui Chen, Sterling Heights, MI (US); Shu Chen, Rochester Hills, MI (US); Bo Yu, Troy, MI (US); Joon Hwang, Pflugerville, TX (US); Carl P. Darukhanavala, Royal Oak, MI (US); Vivek Vijaya Kumar, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 463 days.

(21) Appl. No.: 17/933,895

(22) Filed: Sep. 21, 2022

(65) Prior Publication Data

US 2024/0094411 A1    Mar. 21, 2024

(51) Int. Cl.
*G01S 19/39* (2010.01)
*G01S 19/40* (2010.01)

(52) U.S. Cl.
CPC ............ *G01S 19/396* (2019.08); *G01S 19/40* (2013.01)

(58) Field of Classification Search
CPC ........ G01S 19/396; G01S 19/40; G01S 19/14; G01S 5/0027; G01S 19/07
See application file for complete search history.

(56) References Cited

U.S. PATENT DOCUMENTS

| | | | |
|---|---|---|---|
| 11,188,089 B2 * | 11/2021 | Houts | G01S 7/4808 |
| 11,898,853 B2 * | 2/2024 | Xie | G01C 21/32 |
| 2020/0124741 A1 * | 4/2020 | Walker | G06N 5/046 |
| 2021/0302169 A1 * | 9/2021 | Xie | G05D 1/0088 |
| 2024/0012157 A1 * | 1/2024 | Gum | G01S 19/24 |
| 2024/0094403 A1 * | 3/2024 | Wang | G01S 19/071 |

* cited by examiner

*Primary Examiner* — Richard M Camby
(74) *Attorney, Agent, or Firm* — Vivacqua Crane, PLLC

(57) ABSTRACT

A global positioning system (GPS)-bias detection and reduction system including a GPS-bias model having GPS statistical data creating a database representing data collected from a vehicle group having thousands or multiple thousands of vehicles saved in a database. At least one newly collected vehicle GPS data point is compared to the GPS statistical data to reduce negative effects of GPS-bias and to update the vehicle GPS-bias correction based on a previous GPS-bias model. A selected road node and a segment of a roadway have a map matching performed using a nearest service from a collection location of the GPS statistical data. A GPS-bias is calculated using a look-up of the database. An estimated horizontal position error (EHPE) defining a quality indicator is applied to distinguish a good quality GPS statistical data from a poor quality GPS statistical data.

20 Claims, 12 Drawing Sheets

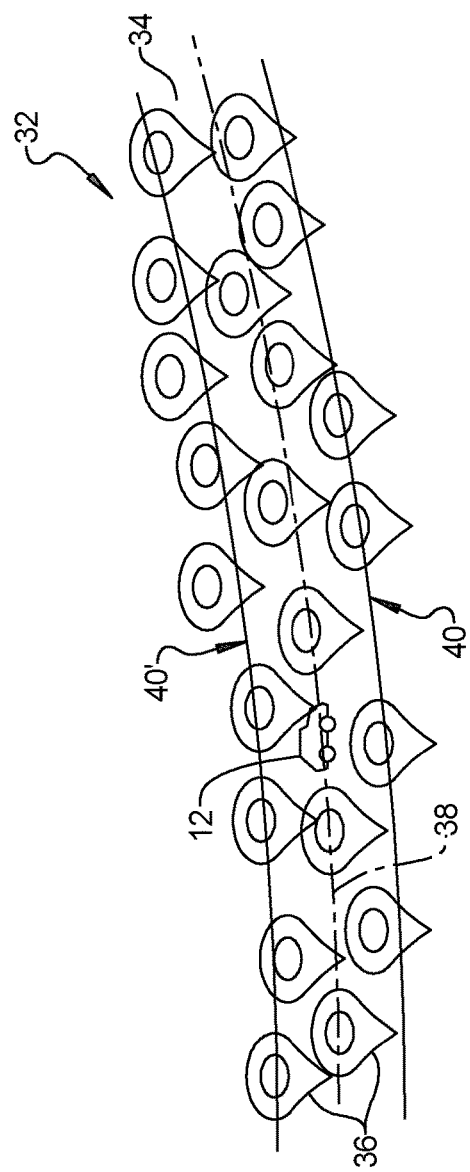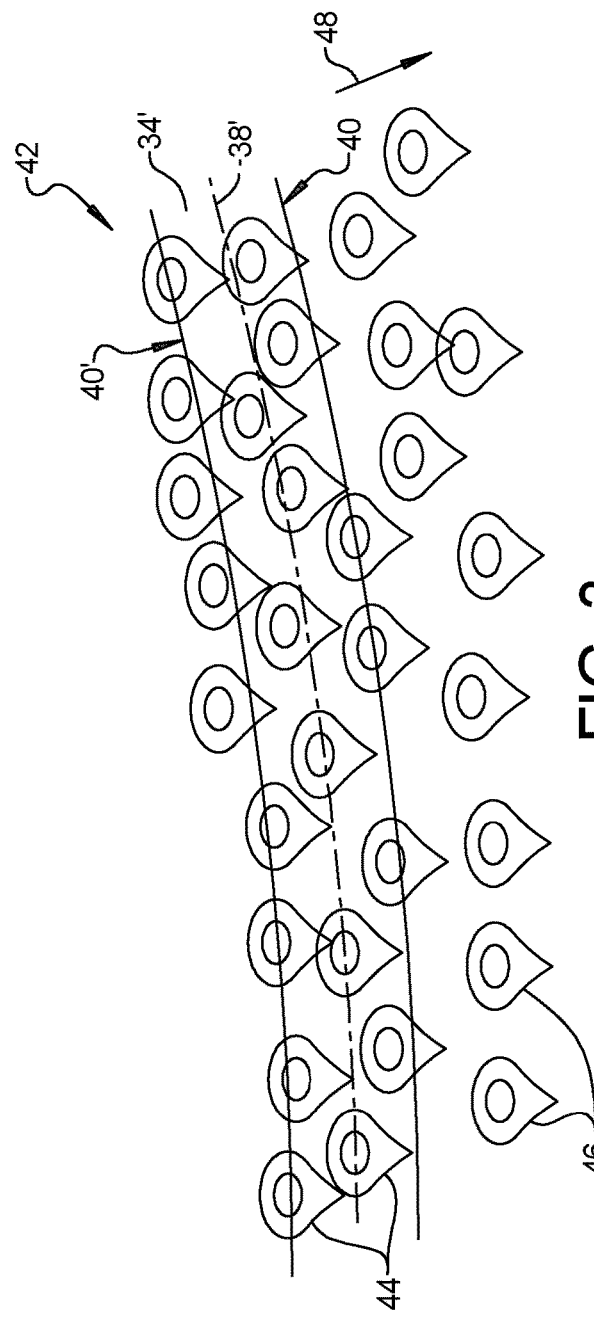

| Segment | Ehpe | Samples | Distance d's statistics |
|---|---|---|---|
| | 0 | P1,P4,... | (MEAN, SAMPLE,_SIZE, STD, SEM, CONFIDENCE INTERVAL) |
| | 1 | ... | ... |
| Segment_1_2 | 2 | ... | ... |
| | 3 | ... | ... |
| | ... | ... | ... |
| | 9 | ... | ... |
| | 0 | 0 | ... |
| | 1 | 0 | ... |
| Segment_2_3 | 2 | P2,P3,... | ... |
| | 3 | ... | ... |
| | ... | ... | ... |
| | 9 | ... | ... |
| ... | ... | ... | ... |

| Segment | Ehpe | d_mean | d_offset |
|---|---|---|---|
| | 0 | 2.30 | 0 |
| | 1 | 2.53 | 0.23 |
| Segment_1_2 | 2 | ... | ... |
| | 3 | | ... |
| | ... | | ... |
| | 9 | | ... |
| | 0 | 1.4 | 0 |
| | 1 | 1.3 | 0 |
| Segment_2_3 | 2 | 1.4 | 0.1 |
| | 3 | ... | ... |
| | ... | | ... |
| | 9 | | ... |
| ... | ... | | ... |
| ... | ... | | ... |

FIG. 11

| Segment | Ehpe | d_offset |
|---|---|---|
|  | 0 | 0 |
|  | 1 | 0.23 |
| Segment_1_2 | 2 | ... |
|  | 3 | ... |
|  | ... | ... |
|  | 9 | ... |
|  | 0 | 0 |
|  | 1 | 0 |
| Segment_2_3 | 2 | 0.1 |
|  | 3 | ... |
|  | ... | ... |
|  | 9 | ... |
| ... | ... | ... |
| ... | ... | ... |

FIG. 12

GLOBAL POSITIONING SYSTEM BIAS DETECTION AND REDUCTION

The present disclosure relates to vehicle global positioning system used in determining an accurate vehicle location.

Accurate determination of vehicle position using vehicle global positioning system (GPS) navigation systems is necessary to allow autonomous vehicle operation as well as self-driven vehicle GPS operation. In present GPS navigation systems objects including surrounding terrain, hills, trees, buildings and the like introduce noise to GPS signals. GPS noise may include random noise and GPS-bias is defined as GPS error which is biased toward specific directions. Inclusion of GPS-bias may result in a preliminary mean vehicle location which deviates from a true vehicle location, defined as a ground-truth location.

Crowd sourced data is a form of secondary data defining data that is collected by any party. Crowd sourced GPS data, although available across multiple vehicle lines, has not historically been available for GPS map use due to inclusion of mean location deviation from the ground-truth location which is incorporated in the crowd-sourced vehicle data, which may result in inaccurate vehicle travel paths. Present approaches to incorporate crowd sourced vehicle data have employed vehicle sensor data and performed comparisons from multiple GPS station test results. This approach has identified only GPS station instrumental biases, which is not accurate enough to generate a vehicle position to a desired accuracy.

Thus, while current vehicle GPS navigation systems achieve their intended purpose, there is a need for a new and improved vehicle GPS navigation system.

SUMMARY

According to several aspects, a GPS-bias detection and reduction system includes a GPS-bias model having GPS statistical data creating a database representing a data set collected from a vehicle group having thousands or multiple thousands of vehicles saved in a database. A GPS-bias is calculated using a look-up of the database. At least one newly collected vehicle GPS data point is compared to the GPS statistical data to reduce negative effects of the GPS-bias and to update the vehicle GPS-bias model. A selected road node and a segment of a roadway have a map matching performed using a nearest service from a collection location of the GPS statistical data. An estimated horizontal position error (EHPE) defining a quality indicator is applied to distinguish a good quality GPS statistical data from a poor quality GPS statistical data.

In another aspect of the present disclosure, a plot of the roadway includes multiple first data points individually having an EHPE value of 0 (zero) positioned along a centerline of the roadway.

In another aspect of the present disclosure, multiple second data points individually having an EHPE value of 1 are positioned perpendicularly outwardly of individual ones of the multiple first data points.

In another aspect of the present disclosure, multiple third data points individually having an EHPE value of 2 are positioned perpendicularly outwardly of individual ones of the multiple second data points.

In another aspect of the present disclosure, multiple fourth data points individually having an EHPE value ranging between 3 and 9 are positioned perpendicularly outwardly of individual ones of the multiple third data points.

In another aspect of the present disclosure, a table is generated using a data set from the database, the table having multiple roadway segments identified and a quality indicator column having vehicle GPS data identifying the EHPE value.

In another aspect of the present disclosure, a distance offset (d_offset) defines a data point lateral distance away from a centerline of the roadway.

In another aspect of the present disclosure, a correction to the GPS-bias in the database is made by applying a second GPS data set collected from additional tens of vehicles passing multiple roadway segments during a predetermined time period.

In another aspect of the present disclosure, multiple GPS data points having different EHPE quality indicator values are modeled to represent a statistical offset between the good quality GPS data and the poor quality GPS data.

In another aspect of the present disclosure: at least two successive nodes are separated by at least one segment of the roadway; and a GPS-bias model is created using calculated data statistics defining the GPS-bias for the at least two successive nodes and the at least one segment and offsets calculated between differing quality data for the GPS-bias model.

According to several aspects, a method to perform GPS-bias detection and reduction comprises: collecting vehicle GPS data from multiple vehicles; performing map matching to match a GPS sample onto a road segment in a road network; identifying a GPS sample association node Id in the road network; gathering data statistics based on at least two successive nodes separated by at least one segment of the road network and at least one estimated horizontal position error (EHPE) value; conducting data classification based on the node Id and the EHPE value; selecting a reference EHPE point; calculating a lateral offset to identify a GPS-bias for the at the least two successive nodes and the at least one segment having the at least one EHPE value; and creating a GPS-bias model using calculated data statistics defining the GPS-bias for the at least two nodes and the at least one segment and calculating offsets between differing quality data in the GPS-bias model.

In another aspect of the present disclosure, the method further includes calculating data statistics for distance d values from GPS samples for the at least one segment having the at least one EHPE value, including a sample size, a mean, a standard deviation, a standard error of the mean and a confidence interval.

In another aspect of the present disclosure, the method further includes performing the collecting vehicle GPS data on at least one of a daily, a weekly, and a monthly basis, and saving the data of the GPS-bias model in a memory of a database.

In another aspect of the present disclosure, the method further includes calculating a projection distance to the road segment.

In another aspect of the present disclosure, the method further includes extracting a road topology from a road topology map including an open street map (OSM).

In another aspect of the present disclosure, the method further includes applying map-matching between the vehicle GPS data and at least one road topology map node or at least one segment of an existing map.

In another aspect of the present disclosure, the method further includes: splitting the GPS data based on the at least one road topology node or the at least one segment and the EHPE value including a good quality data and a bad quality data; applying a road topology feature in the existing map as a reference line to calculate a samples' lateral offset; and selecting the EHPE value as a reference point to calculate offsets for other EHPE values based on a confidence interval threshold.

According to several aspects, a method to perform GPS-bias detection and reduction, comprises: collecting a set of GPS samples and generating a GPS-bias model; identifying a next set of GPS samples; matching a selected one of the next set of GPS samples onto a future road segment in a road network; calculating a projection distance from the selected one of the next set of GPS samples to the future road segment; performing a look-up in the GPS-bias model to find a road segment corresponding to the future road segment; and applying a result of the look-up to correct a future collected GPS sample bias.

In another aspect of the present disclosure, the method further includes grouping multiple corrected ones of the future collected GPS sample biases having a reduced bias.

In another aspect of the present disclosure, the method further includes: for the selected one of the next set of GPS samples having a latitude, a longitude, a heading, a speed, and an EHPE value, extracting information including: a vehicle GPS sample ID, a projection distance, a projection point and an associated road segment; perform a first look up in the GPS-bias model of the road segment corresponding to the future road segment; conducting a second look up in the GPS-bias model an offset value using the EHPE value of the selected one of the next set of GPS samples; and correcting a GPS sample bias of the selected one of the next set of GPS samples.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a top plan view of a model roadway having multiple GPS random noise points;

FIG. 3 is a top plan view of a model roadway having multiple GPS random noise points having GPS-bias introduced;

FIG. 11 is a chart presenting data used to calculate a lateral offset between two EHPE sample sets;

FIG. 12 is a table modified from the table saved into the database as the GPS-bias model;

DETAILED DESCRIPTION

The following description is merely exemplary in nature and is not intended to limit the present disclosure, application, or uses.

Figure 1:
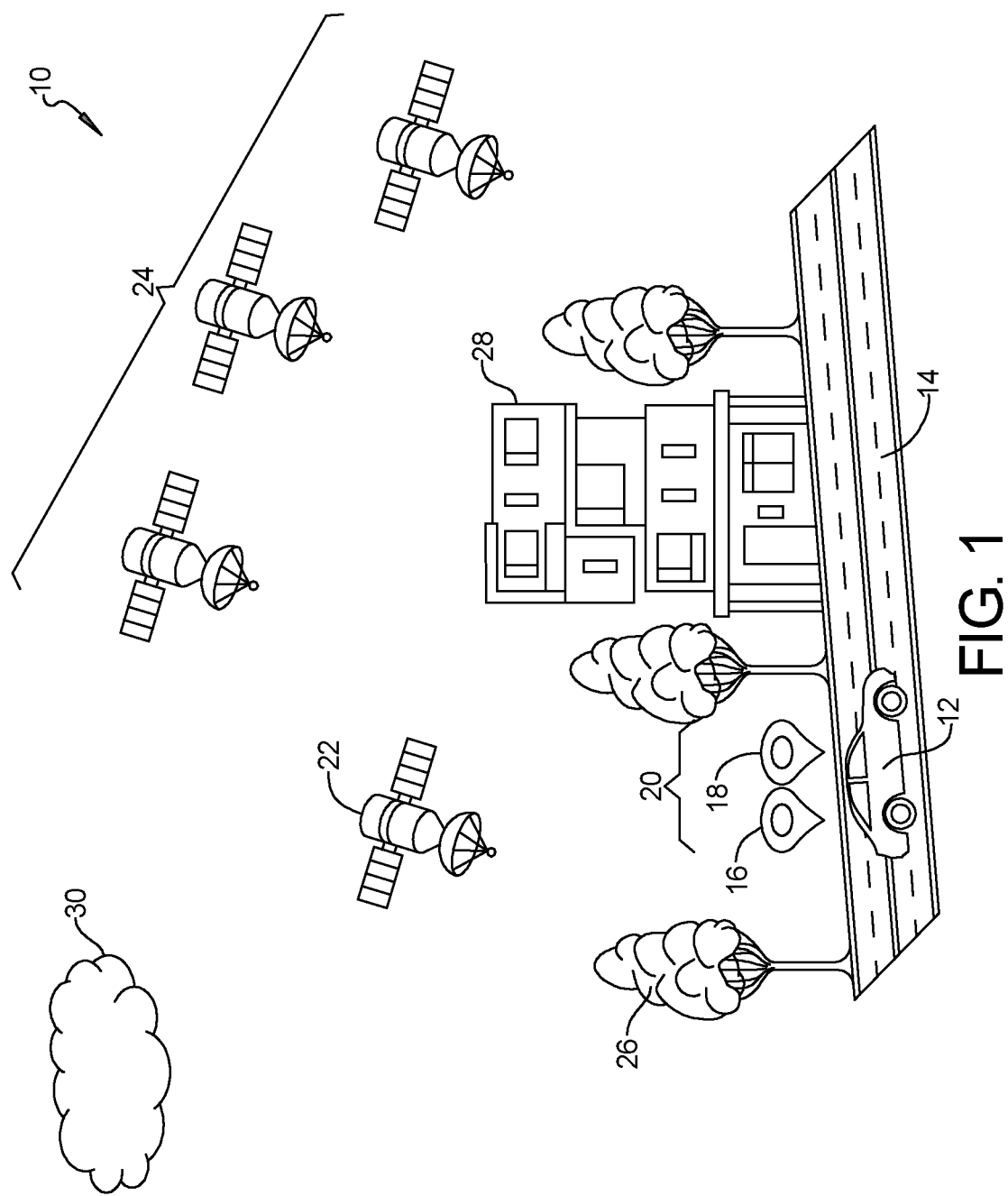
FIG. 1 is a roadway perspective view of a GPS-bias detection and reduction system according to an exemplary aspect.

Referring to FIG. 1, a GPS-bias detection and reduction system 10 is provided for any one of multiple vehicles 12 such as autonomous vehicles, battery powered electric vehicles, hybrid vehicles and other vehicles having active GPS system navigation. A position of a representative one of the vehicles 12 may be accurately determined as the vehicle traverses a roadway 14 by applying a known vehicle position 16 and a corrected vehicle position 18, with a data set available via a data link 20 receiving GPS data from at least one GPS satellite 22 of a GPS satellite network 24. Items known to interfere with accurate GPS position determination include trees 26, buildings 28 and other objects not shown including hills and mountains, which may introduce random noise to the GPS signals received by the vehicles 12. Data of a data set which may also be used by the GPS-bias detection and reduction system 10 may be uploaded to and retrieved from the cloud 30 as will be discussed in greater detail below. It is noted that item numbers identified with an apostrophe herein represent the same or similar items described in a previous discussion of the drawings, such that additional description of the item is not provided.

Referring to FIG. 2 and again to FIG. 1, a plot 32 presents a model of a roadway 34 having multiple GPS random noise points 36 which are deemed to be acceptable when generating GPS position coordinates in locating the vehicle 12 traveling on the roadway 34. It is desirable to maintain a position of the vehicle 12 as close as possible to a roadway centerline 38 and between roadway borders 40, 40'. As presented in FIG. 2 a mean location of the multiple GPS random noise points 36 is close to a ground truth wherein the vehicle 12 is between the roadway borders 40, 40' and proximate to the roadway centerline 38.

Referring to FIG. 3 and again to FIGS. 1 and 2, a plot 42 presents the roadway 34' having multiple GPS random noise points 44 which are deemed to be acceptable when generating GPS position coordinates in locating the vehicle 12 traveling on the roadway 34'. In addition, the roadway 34' has multiple GPS random noise points 46 having GPS-bias introduced whose mean deviates away from the ground truth wherein the deviation deviates primarily in a direction 48 away from the ground truth and away from the roadway centerline 38'. Incorporation of the multiple GPS random noise points 46 would detrimentally affect a map construction impacting an ability of the vehicle 12 to maintain a travel path proximate to the roadway centerline 38'. Crowd-sourced vehicle sensor data including GPS sensor data is leveraged to construct the map. An accuracy of the map depends on the accuracy of the GPS sensor data.

Figure 13:
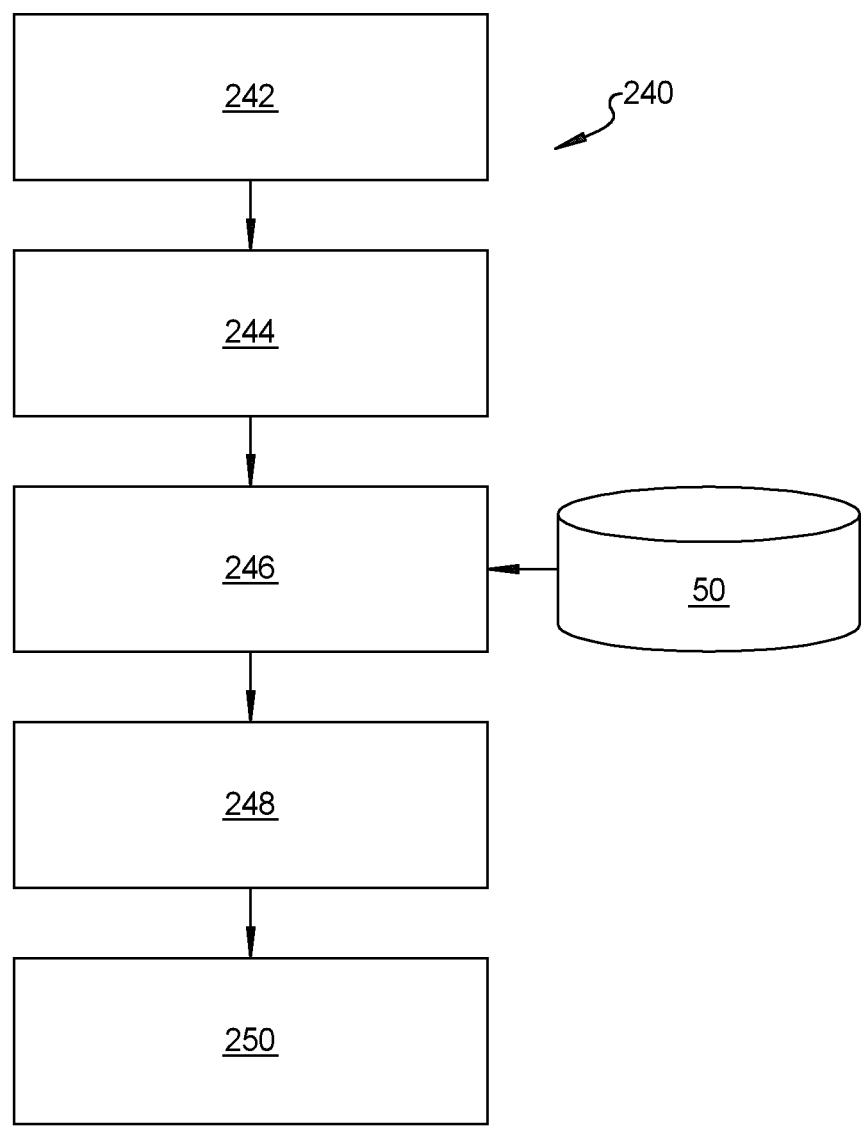
FIG. 13 is a flow diagram identifying algorithm process steps used by the GPS-bias model to leverage data saved in a previously created GPS-bias model to correct newly collected GPS samples.

Referring to FIG. 4 and again to FIGS. 1 through 3, to reduce GPS-bias and improve vehicle position determination at any location along the roadway 14 of FIG. 1, according to several aspects the GPS-bias detection and reduction system 10 generates a GPS-bias model 50 based on GPS statistical data creating a database 52 representing a data set collected from a vehicle group having thousands or multiple thousands of vehicles by initially performing a detection step 54. The data set of the GPS-bias model 50 may then be applied as described below to newly collected vehicle GPS data to reduce negative effects of GPS-bias to update the vehicle GPS-bias correction based on a previous GPS-bias model. A set of algorithms described in greater detail in reference to FIGS. 6 and 13 below are used to create and modify the GPS-bias model 50 from the database 52 of the data set collected from the vehicle group of thousands of vehicles' sensor data.

Thousands of vehicles pass a road segment every day, every week, and every month. Some of the thousands of vehicles get a very accurate GPS fix, due to external conditions such as satellite constellation, weather conditions, and the like, as well as internal conditions including use of a high-end GPS receiver, and the use of inertial measurement unit (IMU) sensors, which are defined as a combination of an accelerometer and a gyroscope sensor. IMU sensors are used to detect movements and measure an intensity of the detected movements in terms of an acceleration. Other vehicles of the thousands of vehicles may get a poor GPS fix.

In an initial step 56, raw data is collected from the database 52. In a second step 58, map matching is performed using the nearest service from the collected data to a selected road node/segment. In a third step 60, a look up of the database 52 is conducted and a calculation of a GPS-bias is performed.

Following the detection step 54, a table 62 is generated using data from the database 52, the table 62 having multiple roadway segments 64 identified. A quality indicator column 66 having vehicle GPS data is also presented in a column 66 identifying an estimated horizontal position error (EHPE). The EHPE define quality indicators presented in column 66 used to distinguish good quality GPS data from bad or poor quality GPS data. A distance offset (d_offset) 68 representing a data point lateral distance away from the roadway centerline 38 is presented for individual ones of the roadway segments 64, for example a first roadway segment 70 and a second roadway segment 72.

Using data from the table 62, a correction step 74 is performed. During any specific or a predetermined time period, traffic flow past an individual data point along the roadway segments 64 may only be tens of vehicles, in lieu of the thousands of vehicles used to create the database 52. After establishing the GPS-bias model 50 the collected GPS data from the tens of vehicles passing the roadway segments 64 for a given predetermined time period may be applied to further correct GPS-bias in the database 52.

Referring to FIG. 5 and again to FIGS. 1 through 4, a plot 78 presents GPS data points having different EHPE quality indicator values, which may be modeled to represent a statistical offset between good quality GPS data and bad or poor quality data. The plot 78 includes the roadway 34' described in reference to FIG. 3 having multiple first data points 80 individually having an EHPE value of 0 (zero) positioned along the roadway centerline 38'. Multiple second data points 82 individually having an EHPE value of 1 are positioned perpendicularly outwardly of the individual first data points 80. Multiple third data points 84 individually having an EHPE value of 3 are positioned perpendicularly outwardly of the individual second data points 82. According to several aspects, the data points having EHPE values of approximately 3 or less are considered to be good quality data points, suitable for use in map development. In addition, as discussed further herein, offset data in the GPS-bias model considered to be good quality may used to reduce a bias from newly collected vehicle GPS data. Multiple fourth data points 86 individually having an EHPE value of 9 are positioned perpendicularly outwardly of the individual third data points 84. Additional data points (not shown) having individual EHPE values ranging between 4 and 8 may also be present extending outwardly from the roadway centerline 38', for example in a perpendicular path 88. According to several aspects data points having EHPE values of approximately 4 or greater in this example are located outward of the roadway border 40 and may be omitted as being of bad or poor quality.

Referring to FIG. 6 and again to FIGS. 1 through 5, a flow diagram 90 summarizes method steps performed to create the GPS-bias model 50. A first algorithm may run on an on-premise server, on the Edge, or on the cloud using the following steps. The first algorithm applies a road topology feature in an existing map such as OSM as a reference line to calculate a samples' lateral offset.

Figure 4:
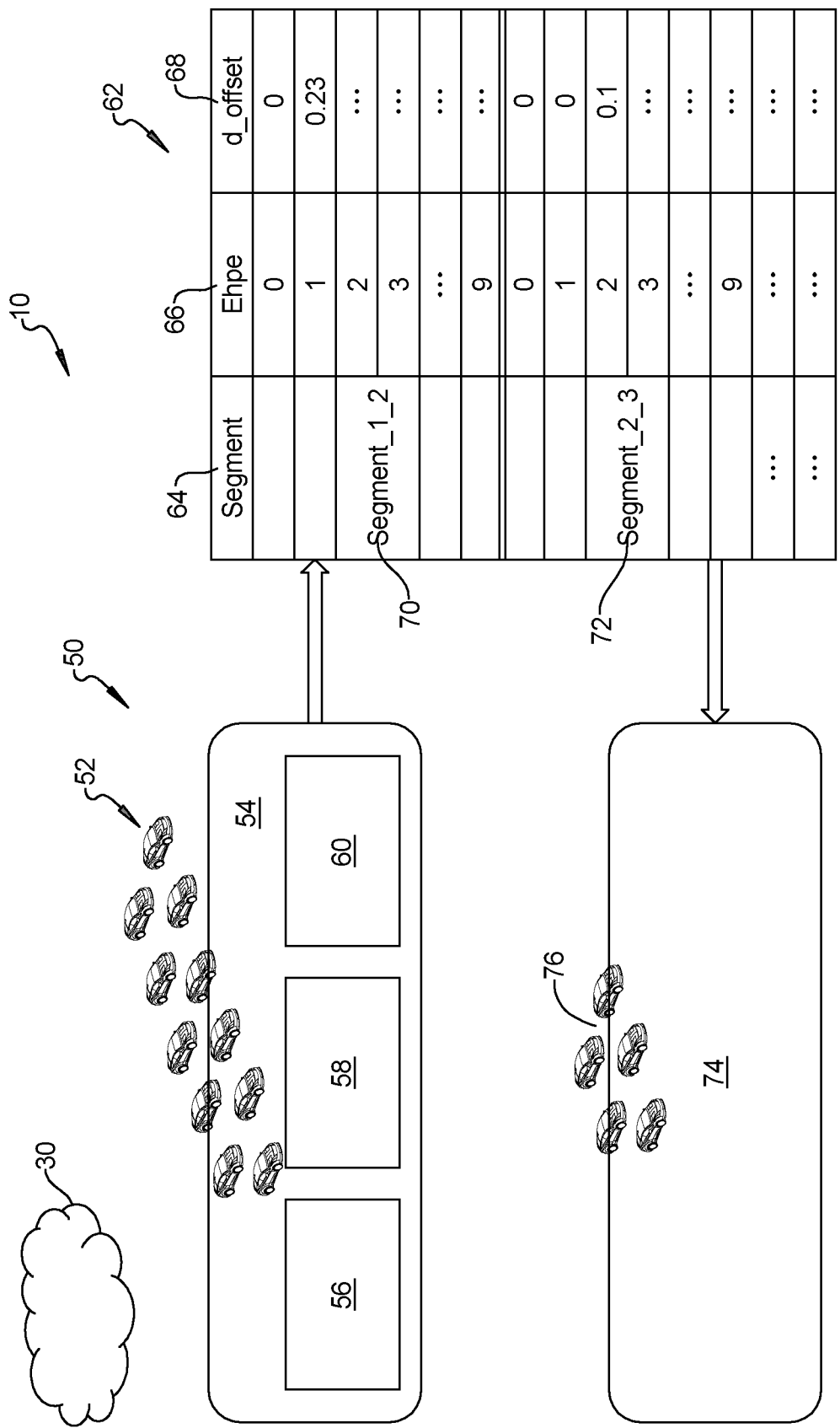
FIG. 4 is a flow diagram and a table identifying steps taken to reduce GPS-bias and improve vehicle position determination.
Figure 5:
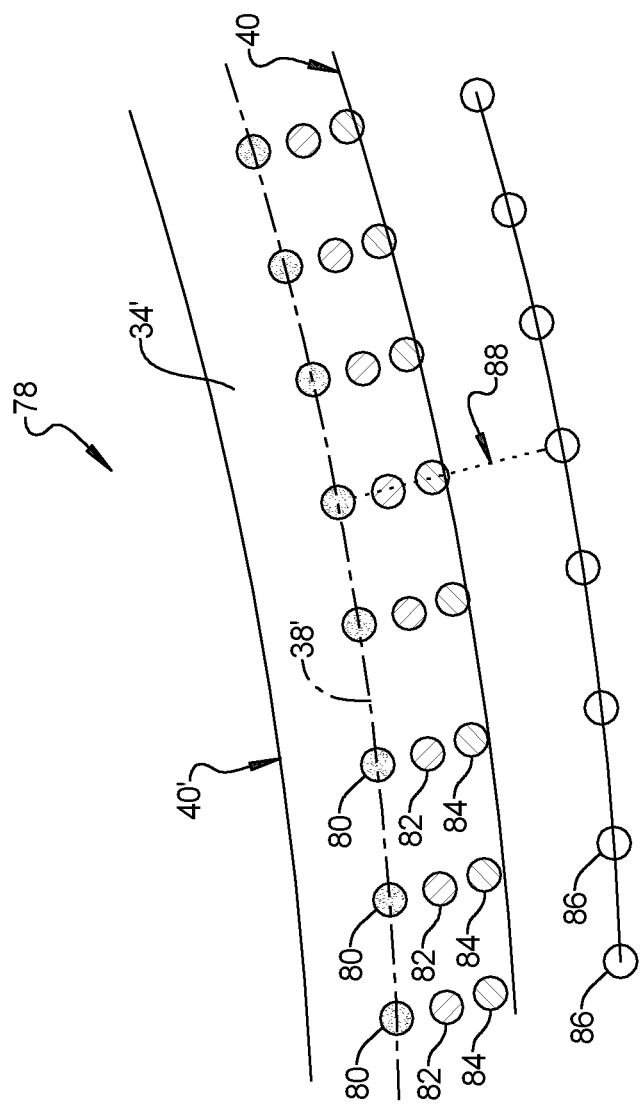
FIG. 5 is a plot presenting GPS data points having different EHPE quality indicator values.
Figure 6:
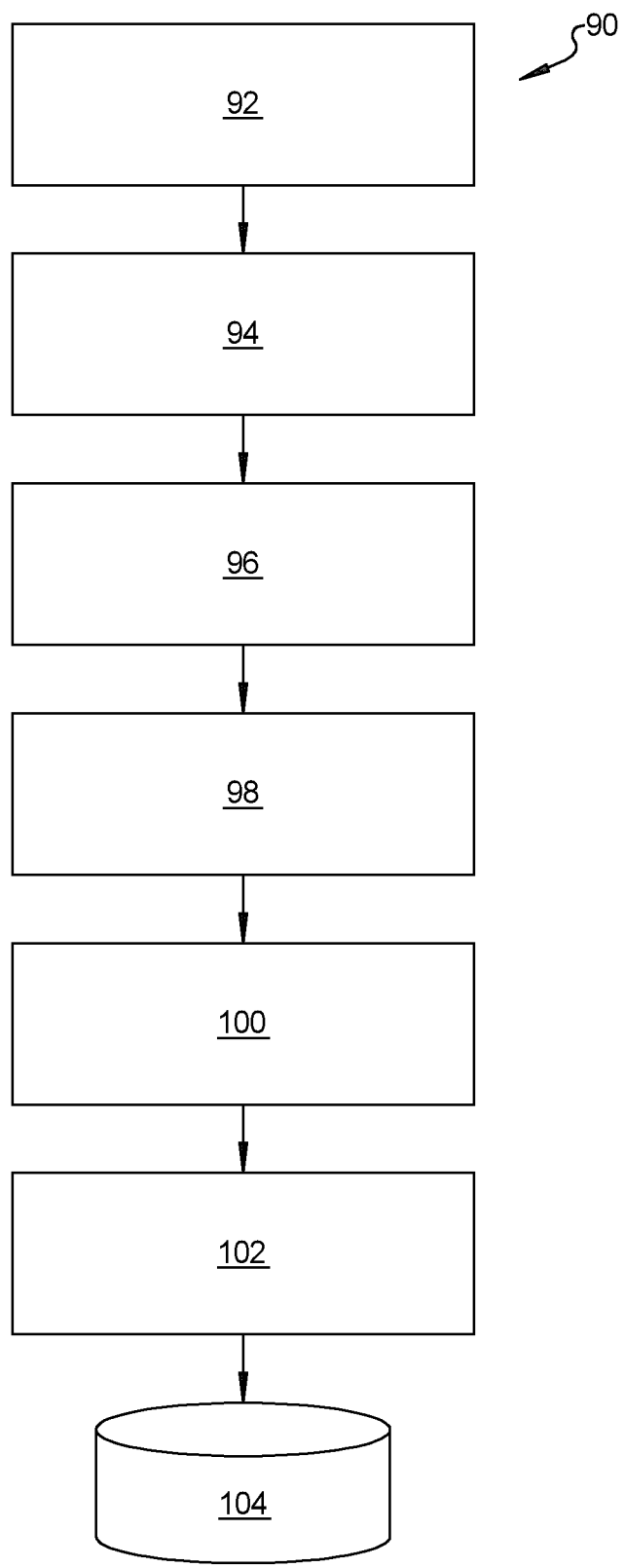
FIG. 6 is a flow diagram summarizes method steps performed to create a GPS-bias model for the system of FIG. 1.

With continuing reference to FIG. 6, in a first bias model creation step 92 vehicle GPS data is collected from multiple vehicles as described in reference to FIG. 4 on at least one of a daily, a weekly, and a monthly basis. In a second bias model creation step 94 map matching is performed as described in greater detail in reference to FIG. 7 below to match a GPS sample onto a road segment in a road network, and then calculate a projection distance to the road segment. Data postprocessing ID is performed based on a road topology in an existing map such as from an OSM (Open Street Map) project. In a third bias model creation step 96 data classification is performed as described in greater detail in reference to FIGS. 8 and 9 below to classify collected data and gather data statistics based on at least two successive nodes and at least one intervening segment information and having at least one EHPE value identified. A map-matching algorithm is then applied between the collected data and one or more OSM nodes or segments of the existing map.

With continuing reference to FIG. 6, in a fourth bias model creation step 98 a reference EHPE point selection is performed as described in greater detail in reference to FIGS. 10, 11 and 12 below. The collected data is split based on the at least one OSM node or the segment and any available EHPE information including good quality data and bad quality data, is provided by the collected data. The first algorithm applies a road topology feature in an existing map such as OSM as a reference line to calculate a samples' lateral offset. In a fifth bias model creation step 100 a lateral offset calculation is performed as described in greater detail in reference to FIG. 13 below to identify a GPS-bias for individual nodes and segments with a corresponding EHPE value assigned. The EHPE value may also be selected as a reference point to calculate offsets for other EHPE values based on a confidence interval threshold. In a sixth bias model creation step 102, the GPS-bias model 50 is created using the calculated data statistics. Offsets between good quality and bad or poor quality data are calculated for the GPS-bias model 50 and the GPS-bias model data is saved in a memory of the database 52. In a seventh bias model creation step 104 maintenance is performed to the GPS-bias model 50 using increases in the collected data.

Data statistics are calculated for distance d values from GPS samples for each segment and EHPE combination, including a sample size, a mean, a standard deviation, a standard error of the mean and a 95% confidence interval, as shown in the fourth column in the table of FIG. 8 and as defined in Equations 1, 2 and 3 below.

$$\text{Mean Value: } \mu = \frac{\sum x_i}{N} \quad \text{Equation 1}$$

$$\text{Standard Deviation: } \sigma = \sqrt{\frac{1}{N}\sum_{i=1}^{N}(x_i - \mu)^2}, \quad \text{Equation 2}$$

$$\text{where } \mu = \frac{1}{N}\sum_{i=1}^{N}x_i.$$

$$\text{Standard error of the mean: } s = \sqrt{\frac{\sum_{i=1}^{N}(x_i - \mu)^2}{N-1}} \quad \text{Equation 3}$$

Where:
μ is the mean value
$x_i$ is an order distance from a sample point
N is a size of the sample
σ is the standard deviation
s is the standard error of the mean Referring to FIG. 7 and again to FIGS. 3 through 6, an exemplary map matching process 106 of the second bias model creation step 94 of FIG. 6 includes identifying an example of a roadway segment 108 having a first node 110, a second node 112, a third node 114 and a fourth node 116. A first GPS data point 118 (P1) is matched with the roadway segment 108 and is located transverse from the roadway segment 108 with respect to a first projection point 120 (P1') positioned along the roadway segment 108. A first projection distance 122 (d1) is then calculated from the first GPS data point 118 (P1) to the first projection point 120 (P1'). A second GPS data point 124 (P2) is matched with the roadway segment 108 and is positioned opposite about the roadway segment 108 with respect to the first projection point 120 (P2). The second GPS data point 124 (P2) is located transverse from the roadway segment 108 with respect to a second projection point 126 (P2') positioned along the roadway segment 108. A second projection distance 128 (d2) is then calculated from the second GPS data point 124 (P2) to the second projection point 126 (P2').

A third GPS data point 134 (P3) is matched with the roadway segment 108 and is located transverse from the roadway segment 108 with respect to a third projection point 136 (P3') positioned along the roadway segment 108. A first projection distance 138 (d3) is then calculated from the third GPS data point 134 (P3) to the third projection point 136 (P3'). A fourth GPS data point 140 (P4) is matched with the roadway segment 108 and is positioned opposite about the roadway segment 108 with respect to the third projection point 136 (P3). The fourth GPS data point 140 (P4) is located transverse from the roadway segment 108 with respect to a fourth projection point 142 (P4') positioned along the roadway segment 108. A fourth projection distance 144 (d4) is then calculated from the fourth GPS data point 140 (P4) to the fourth projection point 142 (P4').

Figures 7, 8:
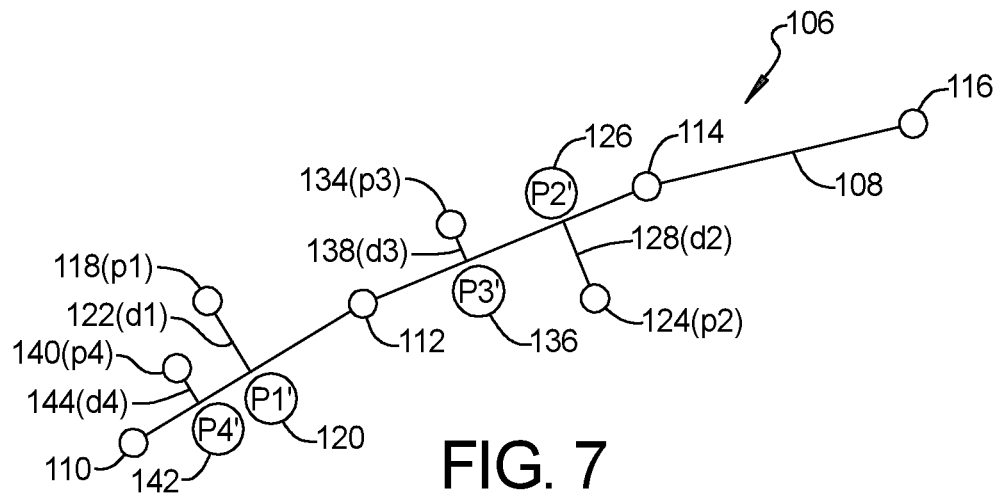
FIG. 7 is a plot providing an exemplary map matching process of a second bias model creation step.
FIG. 8 is a chart presenting data used to establish a baseline so that an offset between two EHPE sample sets may be calculated.

Referring to FIG. 8 and again to FIG. 7, a chart 146 presents data used to establish a baseline so that the offset between two EHPE sample sets may be calculated. The chart 146 includes a first column 148 identifying segments, a second column 150 identifying EHPE values, a third column 152 providing samples corresponding to the segments, and a fourth column 154 identifying distance statistics including mean, sample size, standard deviation, and a confidence level. The baseline is selected by: 1) setting a reasonable threshold value; 2) For each road segment, the confidence interval value is compared to the threshold value in order from an EHPE 0 to EHPE 9; 3) When the confidence interval value is less than the threshold value, the reference EHPE value is determined, for example: assume the threshold value=0.05, for a first segment 156 defining a segment_1_2, starting from EHPE=0, if the confidence interval value for EHPE=0 is less than the threshold value 0.05, EHPE 0 is chosen as the reference; 4) For a second segment 158 defining a segment_2_3, starting from EHPE=0, if the confidence interval value for EHPE=0 is greater than a threshold value 0.05, continue to EHPE=1; 5) If the confidence interval value for EHPE=1 is less than the threshold value 0.05, the EHPE 1 is selected as the reference; 6) The process continues to successive or next segment and the above items 1 through 6 are repeated. The same steps 1 through 6 identified above with respect to FIG. 6 are repeated for successive next road segments until all the reference EHPE values are determined for each road segment.

Figure 10:
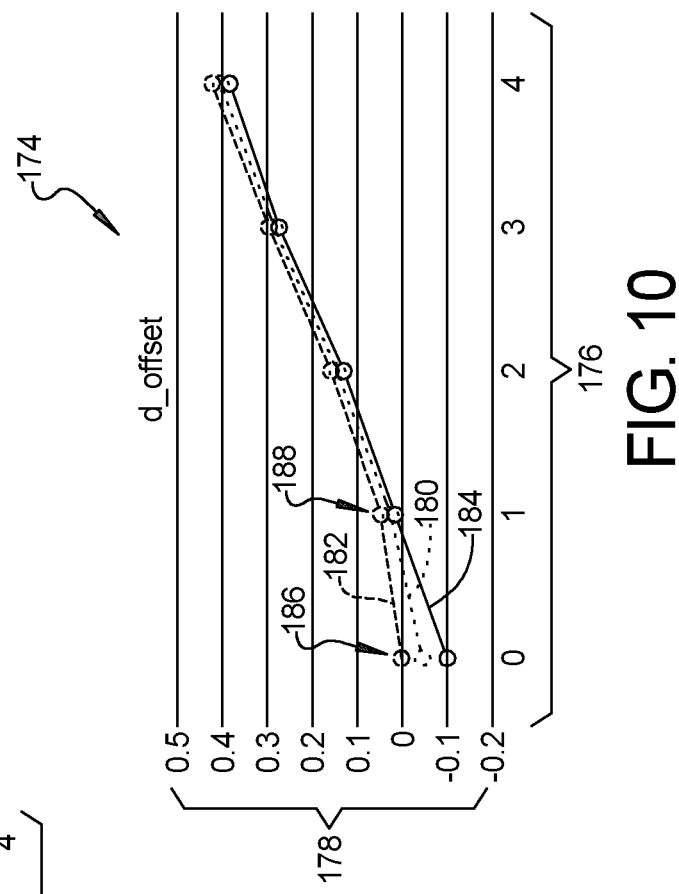
FIG. 10 is a second graph of distance d-mean values and their corresponding confidence intervals at given EHPE values.
Figure 9:
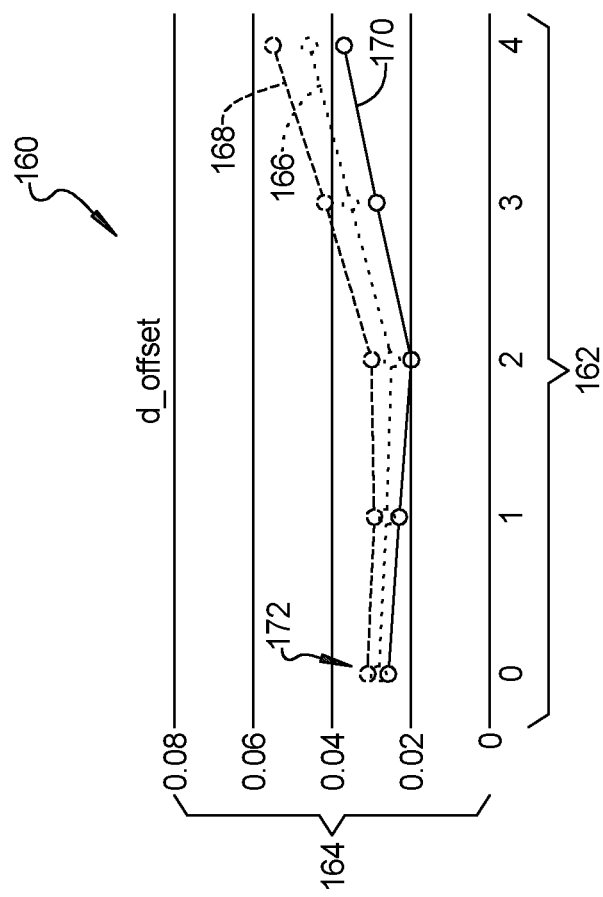
FIG. 9 is a first graph of distance d-mean values and their corresponding confidence intervals at given EHPE values.

Referring generally to FIGS. 9 and 10, two example graphs of distance d's mean values and their corresponding confidence intervals at given EHPE values are presented.

Referring more specifically to FIG. 9 and again to FIG. 7, a graph 160 provides an X axis 162 identifying EHPE values. A Y axis 164 identifies a distance in meters between a sample (such as P1) and its projection point (such as P1'). A first line 166 shows the mean distance between samples and their project points; a second line 168 and a third line 170 show a confidence interval of the sample mean. For the first segment 156 of FIG. 7, defining the Segment_1_2), when the EHPE=0, the confidence interval is smaller than the threshold (0.05) and may be used as a baseline.

Referring more specifically to FIG. 10 and again to FIG. 7, a graph 174 provides an X axis 176 identifying EHPE values. A Y axis 178 identifies a distance in meters between a sample (such as P2) and its projection point (such as P2'). A first line 180 shows the mean distance between samples and their project points; a second line 182 and a third line 184 show a confidence interval of the sample mean. For the second segment 158 of FIG. 7, defining the Segment_2_3), when EHPE=0, the confidence interval is larger than a threshold (such as 0.05) and the EHPE=0 cannot be used as a baseline. When EHPE=1, the confidence interval is smaller than the threshold (0.05), therefore, EHPE=1 can be used as the baseline.

Referring to FIG. 11 and again to FIGS. 9 and 10, a table 190 presents data used to calculate a lateral offset between two EHPE sample sets. The table 190 includes a first column 148' identifying segments, a second column 150' identifying EHPE values, a third column 192 providing mean distance values, and a distance offset column 194 identifying distance offset values also identified as GPS-bias correction offset values. Individual road segment nodes are iterated and the lateral offset is calculated in order from EHPE=0. If the EHPE value is less than or equal to the reference EHPE, the lateral offset will be 0. For other EHPE values, the lateral offset equals the current EHPE mean offset minus the reference EHPE mean offset.

For example, for the first segment 156' defining Segment_1_2, the EHPE value=0 defines a reference EHPE 196 and a reference EHPE mean offset 198 is 2.30. When the reference EHPE mean offset 198 is 2.30, because the EHPE value (herein 0) is less than or equal to the reference EHPE 196 (0), a lateral offset 200 equals 0. For the EHPE value of 1, a lateral offset 202 (0.23) is equal to a current EHPE mean offset 204 (2.53) minus the reference EHPE mean offset 198 (2.30).

For Segment_2_3, for the second segment 158' defining Segment_2_3, the EHPE value=1 defines a reference EHPE 206 and a reference EHPE mean offset 208 is 1.30. When the reference EHPE mean offset 208 is 1.30, because the EHPE value (herein 1) is less than or equal to the reference EHPE 206 (1), a lateral offset 210 equals 0. For the EHPE value of 2, a lateral offset 214 (0.1) is equal to a current EHPE mean offset 216 (1.4) minus the reference EHPE mean offset 208 (1.30).

The above process is repeated for all remaining segments to calculate the lateral offset based on the reference points. After completing the iteration for all individual nodes, the bias group by the segment and the EHPE value combination are stored in the database as the GPS-bias model 50 for further applications.

Referring to FIG. 12 and again to FIGS. 7 and 11, a table 218 modified from the table 190 described in reference to FIG. 11 is saved into the database as the GPS-bias model 50. The GPS-bias model 50 associates three pieces of information together, including: 1) The location including road segments in a road network; 2) a GPS quality indicator; and 3) a GPS-bias correction offset. The GPS-bias correction offset are offset values which also define individual items identified in the distance offset column 194', which may be a two-dimension or three-dimension vector, so that two-dimension or three-dimension correction may be applied to a GPS position Referring to FIG. 13, a flow diagram 240 identifies algorithm process steps used by an amended GPS-bias model 50' to leverage data saved in a previously created version of the GPS-bias model 50 to correct newly collected GPS samples. These algorithm process steps may be run on an on-premise server, on the Edge, or on the cloud. The following process steps are included. In an initiation step 242, future collected GPS samples are identified. In a Map matching step 244 one of the future collected GPS samples is matched onto a future road segment in a road network, and a projection distance to the future road segment is calculated. In a GPS-bias model look-up step 246 a look-up in the GPS-bias Model 50 is performed to find a road segment corresponding to the future road segment. In a correction step 248, the look-up results are applied to make a correction to a future collected GPS sample bias. In a collection step 250 multiple ones of the corrected sample biases having a reduced bias are grouped. Items identified herein as "future" items such as future collected samples are defined as items obtained after an original version of the GPS-bias model 50 is created. Future items may be used to perform maintenance including updating the data of the GPS-bias model 50 and updating roadway data including adding new data points to improve location accuracy.

The following example steps identify how to use a selected point to show how its position is corrected using the right GPS-bias model. Step 1) For the vehicle GPS selected sample point having information including a latitude, a longitude, a heading, a speed, and an EHPE value, the previous map matching algorithm 1 to extract the associated information, including: a vehicle GPS sample ID, a projection distance; a projection point; an associated road segment. Step 2) In a first look up portion, look up the GPS-bias model 50 and find a corresponding road segment. Then in a second look up portion, look up the offset value by the EHPE value of the selected sample point. Step 3) A GPS sample bias is corrected. For example, by applying an assumption the EHPE of a selected sample (Q) is 2, the offset is 0.1 meter. The position of the selected sample (Q) is corrected by 0.1 meter to generate a corrected selected sample (Q').

Figure 14:
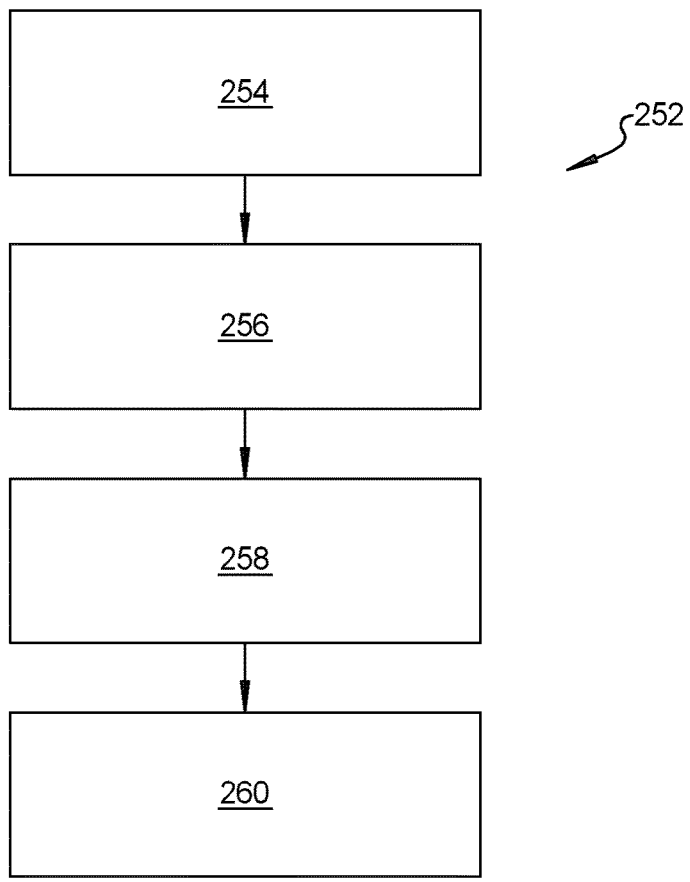
FIG. 14 is a flow diagram identifying algorithm process steps used by the GPS-bias model to provide a vehicle GPS-bias correction based on a previous GPS-bias model.

Referring to FIG. 14, a flow diagram 252 identifies algorithm process steps used by the GPS-bias model 50 to provide a vehicle GPS-bias correction based on a previous GPS-bias model. The following process steps are performed. In a collection step 254 raw GPS data is collected from the vehicle. In a map matching step 256 map matching is performed using a nearest service from the collected data to the road node and segment. In a look-up step 258 look-up the database for a corresponding GPS-bias. In an output step 260, an improved position the GPS-bias is applied to the collected GPS data to get the improved vehicle position, which is output.

Figure 15:
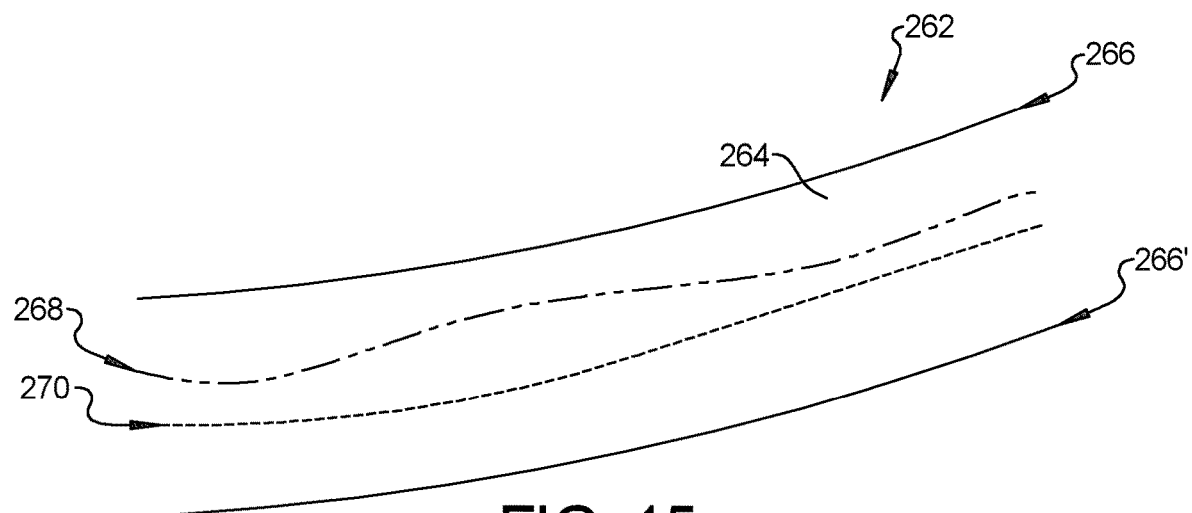
FIG. 15 is a plot of a model roadway having a first projected path representing vehicle reported GPS points during vehicle travel and a second projected path representing vehicle GPS-bias correction points during vehicle travel.

Referring to FIG. 15 and again to FIG. 14, a plot 262 presents a model roadway 264 bounded by a first roadway border 266 and a second roadway border 266'. A first projected path 268 represents vehicle reported GPS points during vehicle travel. A second projected path 270 represents vehicle GPS-bias correction points during vehicle travel.

Figure 16:
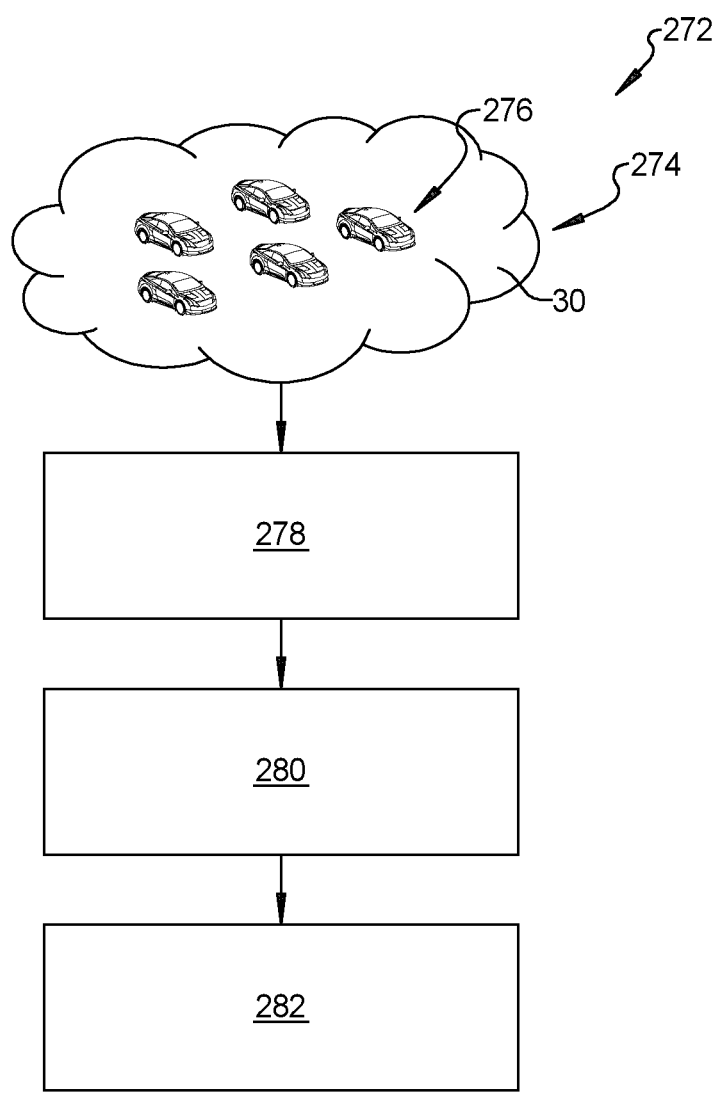
FIG. 16 is a flow diagram identifying algorithm process steps used by the GPS-bias model to reconstruct lane lines after a vehicle GPS-bias correction is made.

Referring to FIG. 16, a flow diagram 272 identifies algorithm process steps used by the GPS-bias model 50 to reconstruct lane lines after a vehicle GPS-bias correction is made, which further combines GPS random noise reduction and a hill climbing algorithm to reconstruct bitmap-based lane lines for building a precise crowd-sourcing map. The following steps are performed. In a collection step 274 raw GPS data is collected from multiple vehicles 276 which may be saved in and retrieved from the cloud 30. In a correction step 278 GPS-bias correction is performed applying a GPS-bias correction algorithm. In an application step 280 GPS random noise reduction is performed applying a GPS random noise reduction algorithm. In a reconstruction step 282 a hill climbing algorithm is used to reconstruct the lane lines. The corrected GPS data of the vehicle may also be used for lane line reconstruction, in order to achieve a higher reconstruction accuracy. The corrected GPS data of the vehicle may also provide a position reference for other object detections, such as stop signs, traffic lights, and the like.

According to several aspects, a GPS-bias model is created to represent a statistic offset to distinguish between good quality GPS data and bad or poor quality GPS data. This offset data in the GPS-bias model is later used to reduce a bias from newly collected vehicle GPS data. Several conditions to do the filter processing on the original raw data are as follows. Condition 1: the Node Id is collected; Condition 2: A projection distance threshold is applied within approximately 5 meters. If the distance between a data sample and a road segment is greater than the 5-meter distance threshold, the data is treated as an outlier, which is then filtered. After data pre-processing, the EHPE values, as attached, of the millions of data collected are within a range from 0 to 9.

A GPS-bias detection and reduction system and method to perform GPS-bias detection and reduction of the present disclosure offers several advantages. These include construction of a GPS-bias model, application of the GPS-bias model to correct vehicle position determination on a roadway. Reconstruction of lane lines after a vehicle GPS-bias correction may also be performed, which further combines GPS random noise reduction and a hill climbing algorithm to reconstruct bitmap-based lane lines for building a precise crowd-sourcing map. When new GPS samples are collected in the future, the GPS-bias model can be used to reduce the bias from these samples.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A global positioning system (GPS)-bias detection and reduction system, comprising:
    a global positioning system (GPS) bias model having GPS statistical data creating a database representing a data set collected from a vehicle group having thousands or multiple thousands of vehicles saved in a database;
    a GPS-bias calculated using a look-up of the database;
    at least one newly collected vehicle GPS data point compared to the GPS statistical data to reduce negative effects of the GPS-bias and to update the vehicle GPS-bias model;
    at least two successive nodes separated by at least one segment of a roadway having a map matching performed using a nearest service from a collection location of the GPS statistical data; and
    an estimated horizontal position error (EHPE) value defining a quality indicator applied to distinguish a good quality GPS data from a poor quality GPS data.

2. The GPS-bias detection and reduction system of claim 1, wherein a plot of the roadway includes multiple first data points individually having an EHPE value of 0 (zero) positioned along a centerline of the roadway.

3. The GPS-bias detection and reduction system of claim 2, including multiple second data points individually having an EHPE value of 1 (one) positioned perpendicularly outwardly of individual ones of the multiple first data points.

4. The GPS-bias detection and reduction system of claim 3, including multiple third data points individually having an EHPE value of 2 (two) positioned perpendicularly outwardly of individual ones of the multiple second data points.

5. The GPS-bias detection and reduction system of claim 4, including multiple fourth data points individually having an EHPE value ranging from 3 (three) to 9 (nine) are positioned perpendicularly outwardly of individual ones of the multiple third data points.

6. The GPS-bias detection and reduction system of claim 1, further including a table generated using the data set from the database, the table having multiple roadway segments identified and a quality indicator column having vehicle GPS data identifying the EHPE value.

7. The GPS-bias detection and reduction system of claim 1, including a distance offset (d_offset) defining a data point lateral distance away from a centerline of the roadway.

8. The GPS-bias detection and reduction system of claim 1, including a correction to the GPS-bias in the database made by applying a second GPS data set collected from additional tens of vehicles passing multiple roadway segments during a predetermined time period.

9. The GPS-bias detection and reduction system of claim 1, including multiple GPS data points having different EHPE quality indicator values, modeled to represent a statistical offset between the good quality GPS data and the poor quality GPS data.

10. The GPS-bias detection and reduction system of claim 1, wherein the GPS-bias model is created using calculated data statistics defining the GPS-bias for the at least two successive nodes and the at least one segment and offsets calculated between differing quality data for the GPS-bias model.

11. A method to perform global positioning system (GPS)-bias detection and reduction, comprising:
    collecting vehicle global positioning system (GPS) data from multiple vehicles;
    performing map matching to match a GPS sample onto a road segment in a road network;
    identifying a GPS sample association node Id in the road network;
    gathering data statistics based on at least two successive nodes separated by at least one segment of the road network and at least one estimated horizontal position error (EHPE) value;
    conducting data classification based on the node Id and the EHPE value;
    selecting a reference EHPE point;
    calculating a lateral offset to identify a GPS-bias for the at the least two successive nodes and the at least one segment having the at least one EHPE value; and
    creating a GPS-bias model using calculated data statistics defining the GPS-bias for the at least two nodes and the at least one segment and calculating offsets between differing quality data in the GPS-bias model.

12. The method of claim 11, further including calculating data statistics for distance d values from GPS samples of the at least one segment having the at least one EHPE value, including a sample size, a mean, a standard deviation, a standard error of the mean and a confidence interval.

13. The method of claim 11, further including performing the collecting vehicle GPS data on at least one of a daily, a weekly, and a monthly basis, and saving data of the GPS-bias model in a memory of a database.

14. The method of claim 11, further including calculating a projection distance to the road segment.

15. The method of claim 11, further including extracting a road topology from a road topology map including an open street map (OSM).

16. The method of claim 15, further including applying map-matching between the vehicle GPS data and at least one road topology map node of the at least one segment of an existing map of the road network.

17. The method of claim 16, further including:
    splitting the vehicle GPS data based on the at least one road topology map node or the at least one segment and the EHPE value including a good quality data and a bad quality data;
    applying a road topology feature in the existing map as a reference line to calculate a samples lateral offset; and
    selecting the EHPE value as a reference point to calculate offsets for at least one other EHPE value based on a confidence interval threshold.

18. A method to perform global positioning system (GPS)-bias detection and reduction, comprising:
    collecting a set of global positioning system (GPS) samples and generating a GPS-bias model;
    identifying a next set of GPS samples;
    matching a selected one of the next set of GPS samples onto a future road segment in a road network;

calculating a projection distance from the one of the next set of GPS samples to the future road segment;
performing a look-up in the GPS-bias model to find a road segment corresponding to the future road segment; and
applying a result of the look-up to correct a future collected GPS sample bias.

19. The method of claim 18, further including grouping multiple corrected ones of the future collected GPS sample biases having a reduced bias.

20. The method of claim 19, further including:
for the selected one of the next set of GPS samples having a latitude, a longitude, a heading, a speed, and an EHPE value, extracting information including: a vehicle GPS sample ID, the projection distance, a projection point and an associated road segment;
performing a first look up in the GPS-bias model of the road segment corresponding to the future road segment;
conducting a second look up in the GPS-bias model an offset value using the EHPE value of the selected one of the next set of GPS samples; and
correcting a GPS sample bias of the selected one of the next set of GPS samples.

* * * * *